United States Patent Office 3,645,966
Patented Feb. 29, 1972

3,645,966
STABILIZATION OF RUBBER
Allen K. Sparks, Des Plaines, and Edwin J. Latos, Chicago, Ill., assignors to Universal Oil Products Company, Des Plaines, Ill.
No Drawing. Original application Dec. 20, 1967, Ser. No. 691,963, now Patent No. 3,530,076, dated Sept. 22, 1970. Divided and this application Apr. 17, 1970, Ser. No. 29,649
Int. Cl. C08f 45/60
U.S. Cl. 260—45.9
8 Claims

ABSTRACT OF THE DISCLOSURE

Stabilizing rubber against ozone cracking by incorporating therein a stabilizing concentration of a synergistic antiozonant mixture of from about 25% to about 75% by weight of N-isopropyl-N'-phenyl-p-phenylenediamine and correspondingly from about 75% to about 25% by weight of N,N'-di-sec-alkyl-p-phenylenedamine containing from 3 to 10 carbon atoms in each alkyl.

CROSS REFERENCE TO RELATED APPLICATIONS

This is a division of application Ser. No. 691,963 filed Dec. 20, 1967 now U.S. Pat. No. 3,530,076 issued Sept. 22, 1970.

BACKGROUND OF THE INVENTION

It is well recognized at the present time that rubber undergoes deterioration due to ozone, which deterioration is different from that caused by oxidation. It also is presently accepted that the best additives to retard such ozone cracking are substituted p-phenylendiamines. Accordingly, a number of differently substituted p-phenylenediamines are currently used in rubber. However, in order to even further improve in the art of antiozonation, extensive investigations have found that certain mixtures of antizonoants offer advantages. These advantages, in some cases, are due to a synergistic effect. However, the different antiozonants and mixtures thereof respond quite differently and generally cannot be predicted in advance whether a synergistic effect will in fact occur. This is not too surprising because the art of chemical additives has been found to be empirical because an additive which will serve effectively in one substrate will not necessarily function satisfactorily in another substrate.

This difference in response also occurs in specific substrates having somewhat different chemical compositions and/or prepared under different processing conditions. More particularly, rubber compositions are prepared from different recipes, using different fillers, accelerators, softeners, retarders, extenders, wax, etc. and the specific processing conditions employed at particular plants vary considerably. Accordingly, an antiozonant which may be quite effective in one rubber composition will be considerably less effective or, in some cases, of substantially no effect in another rubber composition. Because of this, it cannot be predicted in advance whether the use of any given mixture of antiozonants will produce a synergistic effect.

In addition to the above, the use of mixtures of antiozonants is further complicated by other requirements. In the first place, the mixture must be compatible and should not result in antagonistic effects. Furthermore, the mixture must form a homogeneous composition and retain this property over a wide temperature range which may be encountered in the use of the mixture. Still further, the mixture must not affect too greatly the scorching property of the rubber formation containing the mixture.

DESCRIPTION OF THE INVENTION

It now has been found that a synergistic effect is obtained when using a mixture of N-isopropyl-N'-phenyl-p-phenylenediamine and N,N'-di-sec-alkyl-p-phenylenediamines containing from 3 to 10 carbon atoms in each alkyl. It is essential that these different substituted phenylenediamines be used in a proportion of at least about 25% by weight of one of the components in order to obtain the synergistic effect.

This synergistic effect may be considered as surprising because both of the components of the mixture are generally considered as good antiozonants. Accordingly, it would not be expected that the use of the mixture would produce benefits greater than obtained by using either of the components alone.

These improved results permit the use of a lesser amount of total antiozonant in order to obtain equivalent antiozonation and, accordingly, affords important economic advantage. Also, the use of the mixture offers the additional benefits of decreased blooming, improved resistance to flex cracking, etc.

As hereinbefore set forth, the novel synergistic mixture of the present invention comprises from about 25% to about 75% by weight of N-isopropyl-N'-phenyl-p-phenylenediamine and correspondingly from about 75% to about 25% by weight of N,N'-di-sec-alkyl-p-phenylenediamine containing from 3 to 10 carbon atoms in each alkyl. A preferred component is N,N'-di-sec-octyl-p-phenylenediamine. Other antiozonants include N,N'-diisopropyl-p-phenylenediamine, N,N' - di-sec-butyl-p-phenylenediamine, N,N' - di - sec - pentyl-p-phenylenediamine, N,N' - di - sec - heptyl - p - phenylenediamine, N,N'-di-sec-nonyl - p - phenylenediamine and N,N'-di-sec-decyl-p-phenylenediamine.

It is essential that the components of the mixture be used in a concentration of at least about 25% by weight of one of the components. From the data in the appended examples, it will be seen that a mixture containing the N - isopropyl - N' - phenyl-p-phenylenediamine in a concentration of 16% by weight of the mixture did not offer the synergistic effect obtained when the mixture contained this component in a concentration of greater than 25% by weight.

The substituted p-phenylenediamines for use in the present invention are prepared in any suitable manner. In a preferred method, the N,N'-di-sec-alkyl-p-phenylenediamine is pepared by the reductive alkylation of p-phenylenediamine or p-nitroaniline with the desired ketone. For example, N'N-di-(1-ethyl-3-methylpentyl)-p-phenylenediamine is prepared by the reductive alkylation of one mole proportion of p-nitro-aniline with 2 mole proportions of ethyl amyl ketone. Similarly, N,N'-di-(1-methylheptyl)-p-phenylenediamine is prepared by the reductive alkylation of one mole proportion of p-nitro-aniline or p-phenylenediamine with 2 mole proportions of methylhexyl ketone.

The N-isopropyl-N'-phenyl-p-phenylenediamine preferably is prepared by the reductive alkylation of equal mole proportions of p-amino-diphenylamine, p-nitro-diphenylamine or p-nitroso-diphenylamine with acetone. It is understood that other suitable methods of preparing these compounds may be employed.

When preparing these compounds by reductive alkylation, the reductive alkylation is effected in any suitable manner and generally under a hydrogen pressure of from about 100 to 3,000 p.s.i. or more and more particularly of from about 1,000 to about 2,000 p.s.i. and a temperature of from about 200° to about 500° F. and more particularly from about 250° to about 350° F. At least one mole proportion of acetone is used to prepare N-isopropyl-N'-phenyl-p-phenylenediamine and at least two mole proportions of ketone are used in preparing N,N'-di-sec-alkyl-p-phenylenediamine. Generally, however, an excess of ketone is used in the reaction mixture and may comprise up to about 20 or more moles of ketone per mole of p-nitro-aniline, p-phenylenediamine, p-nitro-diphenylamine or p-amino-diphenylamine. Any suitable reductive alkylation catalyst is used. One catalyst comprises an intimate mixture of copper oxide, chromium oxide and barium oxide. Other catalysts include those containing nickel, molybdenum, platinum and/or palladium. A particularly preferred catalyst comprises a composite of alumina with from about 0.1% to 10% or more of platinum, which composite may or may not contain chlorine and/or fluorine in a total concentration of from about 0.2 to 10% or more by weight of the composite.

The synergistic mixture of the present invention is used in rubber in a concentration sufficient to effect the desired stabilization. As hereinbefore set forth, an important advantage of the present invention is that the total antiozonant concentration will be less than required when using either of the components alone. While the concentration may range up to 6%, it generally will be considerably lower and may range from 1.5 to 3% and perhaps up to 4% by weight of the rubber. These concentrations are based on the rubber hydrocarbon exclusive of the other components of the rubber composition and are used in this manner in the present specification and claims.

The synergistic mixture of the present invention also possesses antioxidant properties and contributes to inhibiting oxidative deterioration of the rubber. However, it generally is desirable to also employ an additional antioxidant and any suitable antioxidant may be used including, for example, 2,6-di-tert-butyl-4-methylphenol, phenyl-beta-naphthylamine, 6-phenyl-2,2,4-trimethyl-1,2-dihydroquinoline, marketed under the tradename of "Santoflex-B," 2,2'-methylene-bis-(4-methyl-6-tert-butyl-phenol), the reaction product of acetone and diphenylamine, marketed under the tradename of "B.L.E.," etc. These antioxidants generally are used in a concentration of from about 0.5% to about 3% by weight of the rubber.

When desired, the synergistic mixture of the present invention also is used along with paraffin and/or microcrystalline wax. The wax generally is utilized in a concentration of from 0.5% to about 3% by weight of the rubber.

In one embodiment, the components of the synergistic mixture of the present invention are added separately, in the desired proportions, to the rubber formulation. In another and preferred embodiment, the components of the mixture of the present invention are combined in the desired proportions and then added to the rubber formulation. In still another embodiment, the mixture of the present invention is blended with the additional antioxidant, wax and/or other additives and then is added to one or more of the other components of the rubber formulation. In a preferred embodiment, the mixture of the present invention is incorporated in the latex prior to milling. In still another embodiment, vulcanized rubber may be soaked, dipped or suspended in the mixture of the present invention to apply a surface coating to the rubber, or the mixture of the present invention may be sprayed, poured, or otherwise contacted with the previously vulcanized rubber.

The mixture of the present invention is utilized in any rubber formulation subject to ozone cracking, including those used for automobile and truck tires and tubes, hose, belting, sheet and thread rubber, rubberized fabrics, molded goods, boots and shoes, etc. whether vulcanized in a mold, in open steam, in hot air, or in the cold by the so-called acid process. In another embodiment, the present invention can be utilized for the stabilization of adhesives, elastomers, etc., which tend to crack due to ozone.

When the mixture of the present invention is added to a liquid such as rubber pigment or an oil, it is dissolved therein in the desired proportions. When the mixture of the present invention is added to a solid substrate, it is incorporated therein by milling, mastication, etc. The mixture of the present invention may be utilized as such or as a solution or dispersion or it may be formed as a powder, paste, etc., by compositing with a solid such as carbon black, alumina, silicon, etc.

In general, rubber is classified as a vulcanizable diene hydrocarbon rubber and comprises polymers of conjugated 1,3-dienes, either as polymers thereof or as copolymers thereof with other polymerizable compounds. In one embodiment the rubber is a synthetic rubber including, for example, butadiene-styrene copolymer rubber presently referred to in the art as SBR rubber, Buna-N rubber (NBR) produced from butadiene and acrylonitrile, butyl rubber produced from butadiene and isobutylene, neoprene, ethylene-propylene copolymer rubber (EP), terpolymer rubbers as EP terpolymers, etc. The natural rubbers include Hevea rubber, caoutchouc, balata, gutta-percha, etc. It is understood that the term rubber as used in the present specification and claims is intended to include both synthetic rubber and natural rubber which undergo cracking due to ozone.

The following examples are introduced to illustrate further the novelty and utility of the present invention but not with the intention of unduly limiting the same.

Example I

The synergistic mixture of the present invention comprised mixtures of N-isopropyl-N'-phenyl-p-phenylenediamine ond N,N'-di-sec-octyl-p-phenylenediamine, specifically N,N' - di-(1-ethyl-3-methylpentyl)-p-phenylenediamine. Blends containing different proportions of these components were prepared and evaluated for antiozone properties in rubber.

The rubber used in this example is a synthetic butadiene-styrene rubber of the following recipe:

TABLE I

| Ingredient: | Parts by weight |
| --- | --- |
| SBR-1502 | 100 |
| Furnace black | 40 |
| Zinc oxide | 3 |
| Stearic acid | 2 |
| Sulfur | 2 |
| Accelerator [1] | 1.25 |
| Antiozonant, when employed | 1.75 |

[1] N-cyclohexyl-2-benzothiazole-sulfenamide.

The rubber formulation was cured for 40 minutes at 284° F.

The different rubber samples were elongated 30% placed in an ozone cabinet and exposed to air containing about 50 parts of ozone per 100 million parts of air at 100° F.

The antiozonant or antiozonants in all cases were used in a total concentration of 1.75 parts by weight. The results after 48 hours of exposure in the ozone cabinet are reported in the following table. For comparative purposes, a sample of the rubber containing 1.75 parts of only N-isopropyl-N'-phenyl-p-phenylenediamine and a sample containing 1.75 parts by weight only of N,N'-di-(1-ethyl-3-methylpentyl)-p-phenylenediamine, as well as a control sample containing neither of these additives, also were evaluated and the results are reported in the following table.

TABLE II

| Run No. | Antiozonant, percent of— | | No. of cracks |
|---|---|---|---|
| | N-isopropyl-N'-phenyl-p-phenylenediamine | N,N'-di-(1-ethyl-3-methylpentyl)-p-phenylenediamine | |
| 1 | None | None | >100 |
| 2 | 100 | None | 100 |
| 3 | 75 | 25 | 5 |
| 4 | 50 | 50 | 2 |
| 5 | 33 | 67 | 5 |
| 6 | 16 | 84 | 100 |
| 7 | None | 100 | >100 |

From the data in the above table, it will be seen that the use of either component alone at a concentration of 1.75 parts by weight resulted in 100 or more cracks in the rubber exposed for 48 hours in the ozone cabinet. In contrast, the rubber samples containing the synergistic mixture of the present invention in a proportion of at least 25% by weight of one of the components reduced the number of cracks to 5 or less.

The above data demonstrate the criticality of using at least 25% by weight of one of the components in order to obtain the synergistic effect. This is evident from a comparison of run No. 6 (using one component in a concentration of 16%) with runs No. 3, 4, and 5.

As hereinbefore set forth, N,N'-di-(1-ethyl-3-methylpentyl)-p-phenylenediamine is a very effective antiozonant. However, as the data show, this antiozonant when used alone in this rubber formulation must be employed at a much higher concentration as, for example, 3% by weight or more. However, as the above data also show, a concentration of total antiozonant of 1.75% by weight of the synergistic mixture of the present invention was very effective.

Example II

Another series of evaluations was made in substantially the same method as described in Example I except that the synergistic mixture of this example was a blend of N-isopropyl-N'-phenyl-p-phenylenediamine and N,N'-di-(1,4-dimethylpentyl)-p-phenylenediamine. The same base rubber formulation was used but the samples were elongated 20% prior to exposure in the ozone cabinet. The time to first crack was determined and reported.

A control sample (not containing an antiozonant) of the rubber underwent cracking within 1 hour of exposure in the ozone cabinet. Another sample of the rubber containing 1.75 parts by weight of N-isopropyl-N'-phenyl-p-phenylenediamine underwent cracking within 24 hours of exposure in the ozone cabinet. In contrast, another sample of the rubber containing 1.75 parts by weight of a mixture of 33% by weight of N-isopropyl-N'-phenyl-p-phenylenediamine and 67% by weight of N,N'-di-(1,4-dimethylpentyl)-p-phenylenediamine did not undergo cracking for more than 168 hours of exposure in the ozone cabinet. Still another sample containing 1.75 parts by weight of a mixture of 50% by weight each of these components also did not undergo cracking for more than 168 hours of exposure in the ozone cabinet. Here again, the synergistic effect of the antiozonant mixture of the present invention is demonstrated.

Example III

Substantially the same results as described in Example II were obtained when the total antiozonant concentration was 2 parts by weight. The sample containing only N-isopropyl-N'-phenyl-p-phenylenediamine underwent cracking within 24 hours whereas the samples containing the mixtures of 33%–67% or 50%–50% did not undergo cracking for more than 168 hours.

Example IV

The antiozonant mixtures of this example are blends of N-isopropyl-N'-phenyl-p-phenylenediamine and N,N'-di-(2-octyl)-p-phenylenediamine and used in a total concentration of 1.75 parts by weight. When evaluated in the same manner as described in Example II, the mixtures of 33%–67% and 50%–50% did not undergo cracking for more than 96 hours of exposure in the ozone cabinet. This is in contrast to the sample containing only N-isopropyl-N'-phenyl-p-phenylenediamine in a concentration of 1.75 parts by weight which, as hereinbefore set forth, underwent cracking within 24 hours of exposure in the ozone cabinet.

Example V

The antiozonant composition of this example contains 60% by weight of N-isopropyl-N'-phenyl-p-phenylenediamine and 40% by weight of N,N'-di-isopropyl-p-phenylenediamine. The antiozonant mixture is incorporated in synthetic styrene-butadiene rubber in a concentration of 2.5% by weight. The antiozonant mixture is prepared extraneously and is incorporated into the rubber formulation during milling thereof.

Example VI

The synergistic mixture of this example comprises 30% by weight of N-isopropyl-N'-phenyl-p-phenylenediamine and 70% by weight of N,N'-di-(1,3-di-methylbutyl)-p-phenylenediamine. The antiozonant mixture is incorporated in a concentration of 2.25 parts by weight in natural rubber during milling thereof.

We claim as our invention:

1. Stabilizing vulcanizable diene hydrocarbon rubber against cracking due to ozone which comprises incorporating therein a stabilizing concentration of a synergistic antiozonant mixture of from about 25% to about 75% by weight of N-isopropyl-N'-phenyl-p-phenylenediamine and correspondingly from about 75% to about 25% by weight of N,N'-di-sec-alkyl-p-phenylenediamine containing from 3 to 10 carbon atoms in each alkyl.

2. The method of claim 1 in which said rubber is synthetic rubber.

3. The method of claim 2 in which said rubber is butadiene-styrene rubber.

4. The method of claim 1 in which said rubber is natural rubber.

5. The method of claim 1 in which said N,N'-di-sec-alkyl-p-phenylenediamine is N,N'-di-sec-octyl-p-phenylenediamine.

6. The method of claim 1 in which said N,N'-di-sec-alkyl-p-phenylenediamine is N,N'-di-sec-heptyl-p-phenylenediamine.

7. The method of claim 1 in which said N,N'-di-sec-alkyl-p-phenylenediamine is N,N'-di-sec-hexyl-p-phenylenediamine.

8. The method of claim 1 in which said N,N'-di-sec-alkyl-p-phenylenediamine is N,N'-di-isopropyl-p-phenylenediamine.

References Cited

UNITED STATES PATENTS

| 3,035,014 | 5/1962 | Popoff | 260—45.9 |
| 3,163,616 | 12/1964 | Stahly | 260—45.9 |
| 3,216,959 | 11/1965 | Stahly | 260—45.9 |
| 3,274,250 | 9/1966 | Schneider | 260—45.9 |
| 3,419,939 | 12/1968 | Gentile | 260—45.9 |

HOSEA E. TAYLOR, Primary Examiner

U.S. Cl. X.R.

260—28.5, 41.5, 45.8, 45.95, 577, 805, 814